US009681773B2

(12) United States Patent
McKee et al.

(10) Patent No.: US 9,681,773 B2
(45) Date of Patent: *Jun. 20, 2017

(54) OVEN HAVING AN H-SHAPED ROTATING DOOR

(71) Applicant: Ovention, Inc., Milwaukee, WI (US)

(72) Inventors: Philip R. McKee, Frisco, TX (US); John Denman, McKinney, TX (US)

(73) Assignee: Ovention, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,797

(22) Filed: Sep. 27, 2016

(65) Prior Publication Data
US 2017/0013997 A1   Jan. 19, 2017

Related U.S. Application Data

(63) Continuation of application No. 14/635,765, filed on Mar. 2, 2015, which is a continuation-in-part of (Continued)

(51) Int. Cl.
*A47J 37/04* (2006.01)
*F24C 15/32* (2006.01)
(Continued)

(52) U.S. Cl.
CPC ............. *A47J 37/041* (2013.01); *A21B 1/245* (2013.01); *A21B 1/26* (2013.01); *A21B 1/42* (2013.01); *A21B 1/44* (2013.01); *A21B 3/07* (2013.01); *A47J 37/043* (2013.01); *A47J 37/049* (2013.01); *A47J 37/067* (2013.01); *A47J 37/0629* (2013.01); *A47J 37/0641* (2013.01);
(Continued)

(58) Field of Classification Search
CPC ............................ A47J 37/049; A47J 37/041
USPC ............................. 219/756; 126/19 R, 21 A
See application file for complete search history.

(56) References Cited

U.S. PATENT DOCUMENTS 2,920,177 A   1/1960   Brane
3,169,520 A   2/1965   Smith et al.
(Continued)

FOREIGN PATENT DOCUMENTS

AU   B-41211-85   10/1985
CN   1301477 A   6/2001
WO   2013043285 A1   3/2013

OTHER PUBLICATIONS

International Search Report for PCT/US2016/020348 dated May 31, 2016.
(Continued)

*Primary Examiner* — Gregory Huson
*Assistant Examiner* — Aaron Heyamoto
(74) *Attorney, Agent, or Firm* — Amster, Rothstein & Ebenstein LLP (57) ABSTRACT

An oven comprising a housing, a cavity, an H-shaped rotating door, a motor and a heat source is disclosed. The cavity, which includes an opening, is located within the housing. The H-shaped rotating door, which can be rotated by the motor, includes a first food loading section and a second food loading section. The H-shaped rotating door also serves as a cover to prevent heat within the cavity from escaping through the opening. The heat source provides heat to the cavity to heat up any food item placed on one of the food loading sections located within the cavity.

20 Claims, 6 Drawing Sheets

Related U.S. Application Data application No. 14/045,257, filed on Oct. 3, 2013, now Pat. No. 9,326,639, which is a continuation-in-part of application No. 13/077,143, filed on Mar. 31, 2011, now Pat. No. 9,288,997, and a continuation-in-part of application No. 13/236,695, filed on Sep. 20, 2011, now Pat. No. 8,733,236, and a continuation-in-part of application No. 13/774,617, filed on Feb. 22, 2013, now Pat. No. 8,746,134.

(51) Int. Cl.
    *F24C 15/16*     (2006.01)
    *H05B 6/64*     (2006.01)
    *A47J 37/06*     (2006.01)
    *A21B 1/24*     (2006.01)
    *A21B 1/26*     (2006.01)
    *A21B 1/42*     (2006.01)
    *A21B 1/44*     (2006.01)
    *A21B 3/07*     (2006.01)
    *H05B 1/02*     (2006.01)

(52) U.S. Cl.
    CPC .......... *F24C 15/162* (2013.01); *F24C 15/322* (2013.01); *F24C 15/325* (2013.01); *H05B 1/0263* (2013.01); *H05B 6/6411* (2013.01); *H05B 6/6414* (2013.01); *H05B 6/6473* (2013.01)

(56) References Cited

U.S. PATENT DOCUMENTS

| | | | |
|---|---|---|---|
| 3,910,175 A | 10/1975 | Smith | |
| 4,037,070 A | 7/1977 | Kirpichnikov et al. | |
| 4,244,284 A | 1/1981 | Flavan, Jr. et al. | |
| 4,506,652 A | 3/1985 | Baker et al. | |
| 4,556,043 A | 12/1985 | Bratton | |
| 4,924,763 A | 5/1990 | Bingham | |
| 4,951,648 A | 8/1990 | Shukla et al. | |
| 5,153,402 A | 10/1992 | Quick et al. | |
| 5,277,105 A | 1/1994 | Bruno et al. | |
| 5,305,468 A | 4/1994 | Bruckert et al. | |
| 5,365,918 A | 11/1994 | Smith et al. | |
| 5,404,978 A | 4/1995 | Hagiwara | |
| 5,558,793 A | 9/1996 | McKee et al. | |
| 5,717,192 A | 2/1998 | Dobie et al. | |
| 5,771,786 A | 6/1998 | Chung | |
| 5,826,496 A | 10/1998 | Jara | |
| 5,927,265 A | 7/1999 | McKee et al. | |
| 6,140,626 A | 10/2000 | McKee et al. | |
| 6,369,360 B1 | 4/2002 | Cook | |
| RE37,706 E | 5/2002 | Chung | |
| 6,541,739 B2 | 4/2003 | Shei et al. | |
| 6,880,545 B2 | 4/2005 | Heber | |
| 6,956,191 B2 | 10/2005 | Han et al. | |
| 6,998,582 B1 | 2/2006 | Maroti | |
| 7,004,159 B1 | 2/2006 | Carpenter et al. | |
| 7,381,927 B1 | 6/2008 | Agnello | |
| 8,124,920 B1 | 2/2012 | Weber | |
| 8,253,084 B2 | 8/2012 | Toyoda et al. | |
| 8,733,236 B2 | 5/2014 | McKee | |
| 8,746,134 B2 | 6/2014 | McKee | |
| 9,288,997 B2 | 3/2016 | McKee | |
| 9,326,639 B2 | 5/2016 | McKee et al. | |
| 9,480,364 B2 * | 11/2016 | McKee ................. | A47J 37/049 |
| 2002/0121509 A1 | 9/2002 | Shei et al. | |
| 2004/0144260 A1 | 7/2004 | Backus et al. | |
| 2005/0132899 A1 | 6/2005 | Huang et al. | |
| 2005/0205547 A1 | 9/2005 | Wenzel | |
| 2007/0137633 A1 * | 6/2007 | McFadden ............. | A21B 1/245 126/21 A |
| 2007/0295325 A1 | 12/2007 | Esparza et al. | |
| 2008/0067166 A1 | 3/2008 | Yoder et al. | |
| 2008/0156201 A1 | 7/2008 | Cook | |
| 2008/0216812 A1 | 9/2008 | Dougherty | |
| 2009/0090252 A1 | 4/2009 | Ewald et al. | |
| 2010/0193500 A1 | 8/2010 | Moreth, III | |
| 2010/0282742 A1 | 11/2010 | Uchiyama | |
| 2011/0114634 A1 | 5/2011 | Nevarez | |
| 2012/0247445 A1 | 10/2012 | McKee | |
| 2013/0068211 A1 | 3/2013 | McKee | |
| 2013/0202761 A1 | 8/2013 | McKee | |
| 2013/0213380 A1 | 8/2013 | McKee | |
| 2013/0239822 A1 | 9/2013 | McKee | |
| 2014/0033932 A1 | 2/2014 | McKee et al. | |
| 2015/0164271 A1 | 6/2015 | McKee et al. | |

OTHER PUBLICATIONS

Written Opinion of International Search Authority for PCT/US2016/020348 dated May 31, 2016.
Notice of Allowance for U.S. Appl. No. 14/045,257 dated Jan. 11, 2016.
International Search Report of PCT/US2014/058836 dated Jan. 7, 2015.
Written Opinion of PCT/US2014/058836 dated Jan. 7, 2015.
Supplemental European Search Report for PCT/US2012/051276 dated Mar. 19, 2015.
International Search Report for PCT/US2012/051276 dated Nov. 2, 2012.

\* cited by examiner

OVEN HAVING AN H-SHAPED ROTATING DOOR

CROSS REFERENCE TO RELATED APPLICATIONS

This application is a continuation of U.S. application Ser. No. 14/635,765, filed on Mar. 2, 2015, now U.S. Pat. No. 9,480,364, which is a continuation-in-part of U.S. application Ser. No. 14/045,257, filed on Oct. 3, 2013, now U.S. Pat. No. 9,326,639, which is a continuation-in-part of U.S. application Ser. No. 13/077,143, filed on Mar. 31, 2011, now U.S. Pat. No. 9,288,997, also a continuation-in-part of U.S. application Ser. No. 13/236,695, filed on Sep. 20, 2011, now U.S. Pat. No. 8,733,236, and also a continuation-in-part of U.S. application Ser. No. 13/774,617, filed on Feb. 22, 2013, now U.S. Pat. No. 8,746,134, the entire contents of each of which are incorporated herein by reference.

FIELD OF INVENTION

The present invention relates to compact ovens in general, and in particular to an oven having an H-shaped rotating door, which is capable of providing continuous food cooking while minimizing heat loss.

BACKGROUND OF THE INVENTION

A conveyor oven typically has a first opening through which uncooked food enters and a second opening at the opposite end of the oven through which cooked food exits. A stainless steel conveyor belt is commonly used to carry food items from a loading platform through a heated cavity between the first and second openings and ultimately onto an unloading platform. The conveyor belt extends past both openings sufficiently to allow safe insertion and retrieval of food items from the loading and unloading platforms. This arrangement allows food items to be placed on the conveyor belt on a continuous basis to achieve sequential steady-state cooking. The only limit to how many substantially identical food items may be placed in the conveyor oven is the speed of the conveyor belt, which correlates to the residence time inside the heated cavity for food items to be sufficiently cooked.

When food items offered by a commercial food service operation such as a restaurant are to be cooked at the same temperature for the same amount of time in a relatively large kitchen area, a conveyor oven is particularly advantageous. The operator need only set the temperature, blower speed and conveyor belt speed as necessary to cook the selected foods. Once these three parameters are set, the oven may be operated continuously without any further adjustments. Even a person unskilled in the art of cooking is able to prepare high-quality cooked food products simply by placing them on the loading platform of a conveyor oven. The ease of operation and high throughput make conveyor ovens highly desirable in restaurants and other commercial food service settings that have sufficient space to accommodate them.

However, conveyor ovens also have their disadvantages. For example, most commercial food service operations offer a variety of different food items, such as pizza, chicken, vegetables and pie, which require a wide range of cooking times and heat transfer profiles. Even a single food order at a restaurant may include a variety of food items, and different food items require different cooking times, temperatures and blower speeds. Conveyor ovens are very efficient when cooking similar food items, but not for cooking a variety of food items that require vastly different cooking times and heat transfer profiles. In addition, the two openings contribute to tremendous heat loss during the operation of conveyor ovens. The lost heat must be replaced in order to maintain cook temperature, and as a result conveyer ovens are not energy efficient. Furthermore, the space required by the loading and unloading platforms of conveyor ovens limit the application of conveyor ovens to relatively large commercial kitchens.

Consequently, it would be desirable to provide a reduced footprint oven with the efficiency of conveyor ovens while enabling different cooking times and temperatures, and without the large amount of heat loss associated with conveyor ovens.

BRIEF DESCRIPTION OF THE DRAWINGS

The invention itself, as well as a preferred mode of use, further objects, and advantages thereof, will best be understood by reference to the following detailed description of illustrative and exemplary embodiments when read in conjunction with the accompanying drawings, wherein.

SUMMARY OF THE INVENTION

It has now been found that the above and related objects of the present invention are obtained in the form of several related aspects, including an oven having an H-shaped rotating door.

More particularly, the present invention relates to an oven comprising a housing, a cavity located within the housing, wherein the housing includes an opening into the cavity, an H-shaped rotating door comprising a first food loading section and a second food loading section, a motor for rotating the H-shaped rotating door, and a heat source for providing heat to the cavity to heat up any food item placed on one of the first and second food loading sections located within the cavity. The H-shaped rotating door serves as a cover to prevent heat within the cavity from escaping through the opening when one of the first and second loading sections is placed within the cavity.

The present invention also relates to an oven comprising a housing, a cavity located within the housing, wherein the housing includes an opening into the cavity, a rotating door comprising (1) a first food loading section, (2) a second food loading section, (3) a first side panel adjacent to one side edge of the first and second food loading sections, (4) a second side panel adjacent to the opposite side edge of the first and second food loading sections, and (5) a mid panel connecting the mid sections of the first and second side panels and serving as a divider between the first and second food loading sections, and a heat source for providing heat to the cavity. When one of the first and second food loading sections is located within the cavity, the other one of the first and second food loading sections is located outside of the cavity and a portion of the first side panel, a portion of the second side panel, and the mid panel that are adjacent to the one of the first and second food loading sections substantially block the opening to prevent the heat within the cavity from escaping through the opening.

The present invention further relates to an oven comprising a housing, a cavity located within the housing, wherein the housing includes an opening into the cavity, a heat source for providing heat to the cavity, a rotating door comprising (1) a first food loading section, (2) a second food loading section, (3) a first side panel adjacent to one side edge of the first and second food loading sections, (4) a second side panel adjacent to the opposite side edge of the first and second food loading sections, and (5) a mid panel connecting the mid sections of the first and second side panels and serving as a divider between the first and second food loading sections, and a control panel for entering a first cook setting for a first food item placed on the first food loading section and a second cook setting for a second food item placed on the second food loading section. When one of the first and second food loading sections is located within the cavity, the other one of the first and second food loading sections is located outside of the cavity and a portion of the first side panel, a portion of the second side panel, and the mid panel that are adjacent to the one of the first and second food loading sections substantially block the opening to prevent the heat within the cavity from escaping through the opening. In addition, the first and second cook settings are independently controllable by the control panel.

All features and advantages of the present invention will become apparent in the following detailed written description.

DETAILED DESCRIPTION OF PREFERRED EMBODIMENTS

Figure 1:
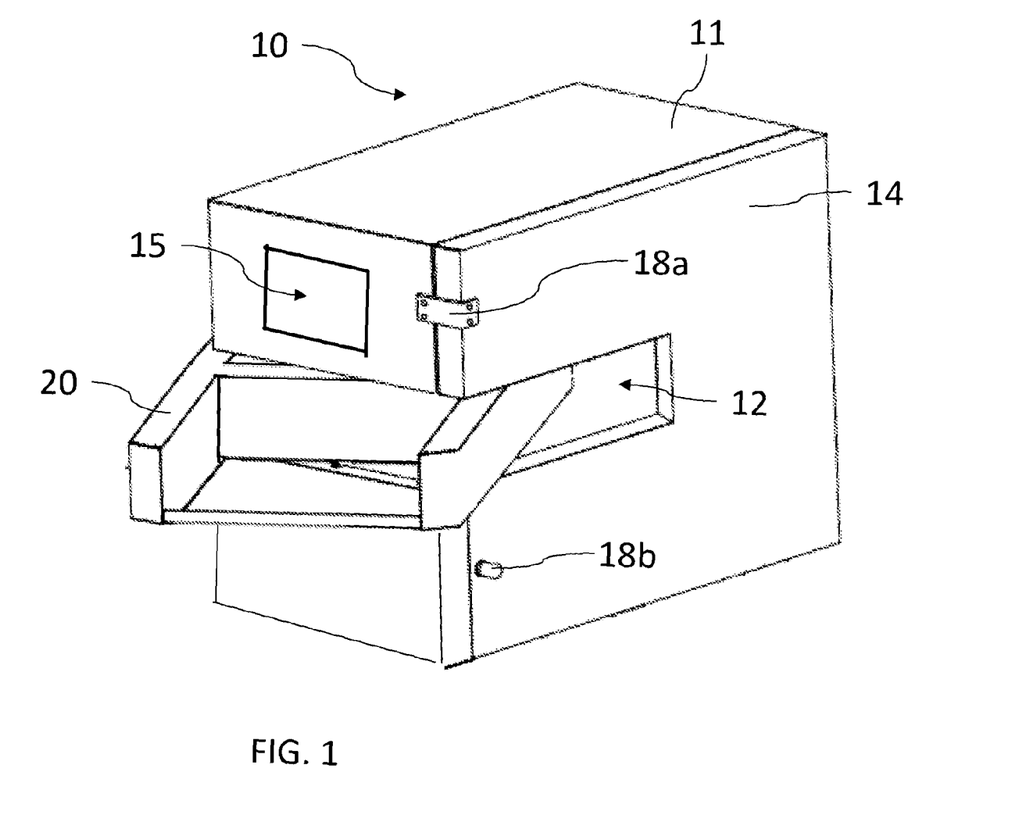
FIG. 1 is an isometric view of an oven, in accordance with an exemplary embodiment of the present invention.

Referring now to the drawings and in particular to FIG. 1, there is depicted an isometric view of an oven, in accordance with an exemplary embodiment of the present invention. As shown, an oven 10 includes a housing 11 having an opening 12, a side access panel 14 and an H-shaped rotating door 20. As the name implies, H-shaped door 20 is a rotatable oven door formed in the shape of a letter "H" or the like. The size and dimension of opening 12 and H-shaped rotating door 20 may be designed to accommodate the largest food item that can be allowed to be placed within the oven 10. Side access panel 14 may be secured to housing 11 via latches 18a and 18b. Side access panel 14 may serve as a door to access the inside of the oven 10 for the purposes of, for example, cleaning, maintenance, and/or repair.

The oven 10 may also include a control panel 15. Control panel 15 may be implemented with a touchscreen, a keypad, a liquid crystal display (LCD), and/or other means for entering cook settings. In alternative embodiments, the oven 10 may comprise more than one control panel (e.g., one control panel for each of first and second food loading sections 21, 22 shown in FIG. 2A). Even though FIG. 1 shows control panel 15 located on the top front portion of the oven 10, it can also be placed on the bottom front portion, on the side portion, or any other place on the oven which is readily accessible to an operator. Through the control panel 15, an operator can enter commands and/or cook setting parameters, such as cooking temperature, cooking time, blower speed, etc., to effectuate cooking controls on any food items placed within the oven 10.

Figure 2A:
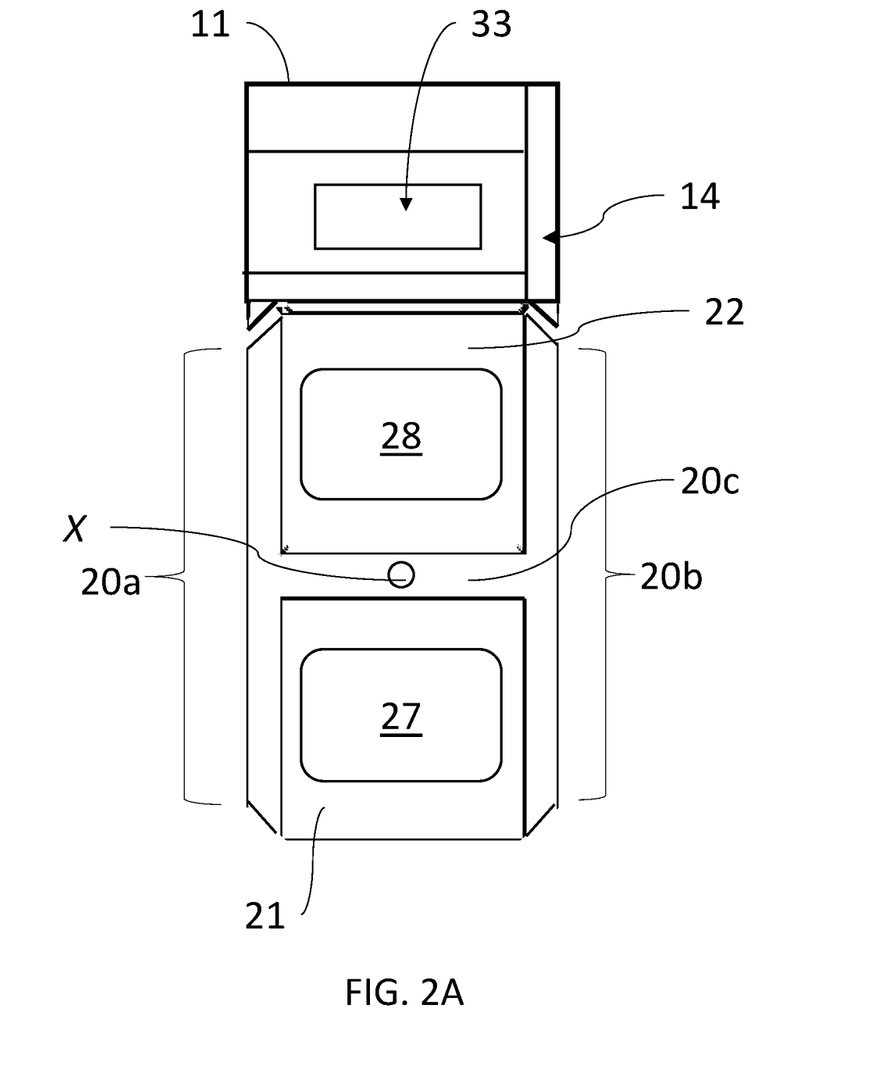
FIGS. 2A-2C are top, side and front cross-sectional views of the oven from FIG. 1, respectively, in accordance with an exemplary embodiment of the present invention.
Figure 2B:
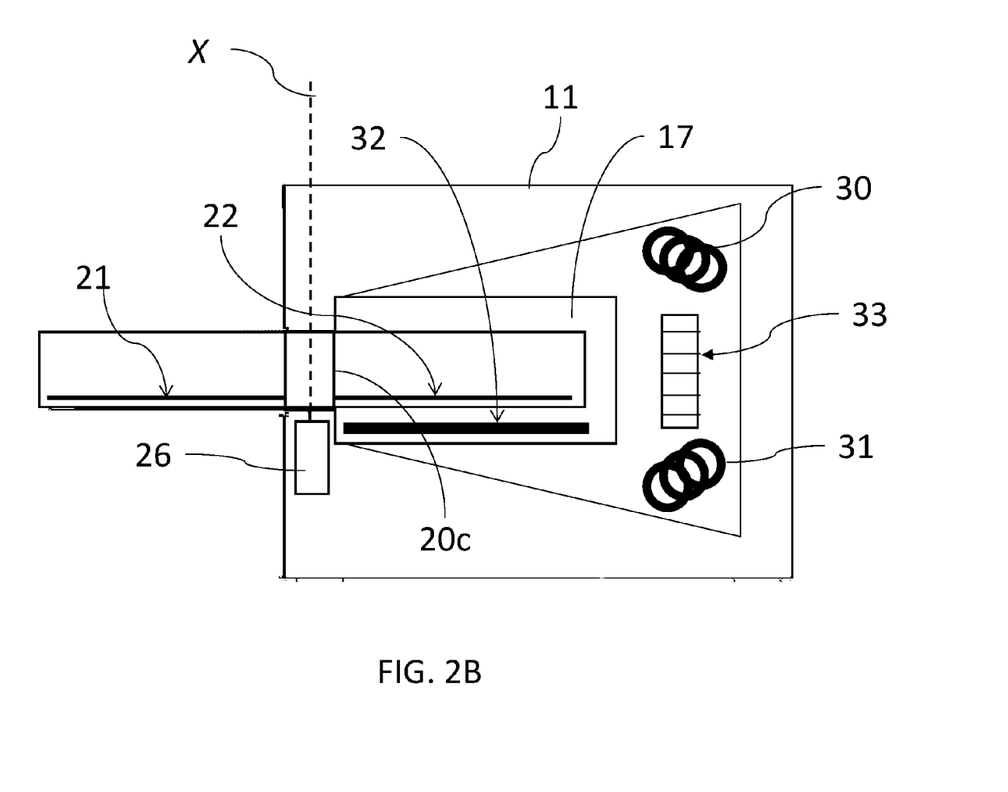
Figure 2C:
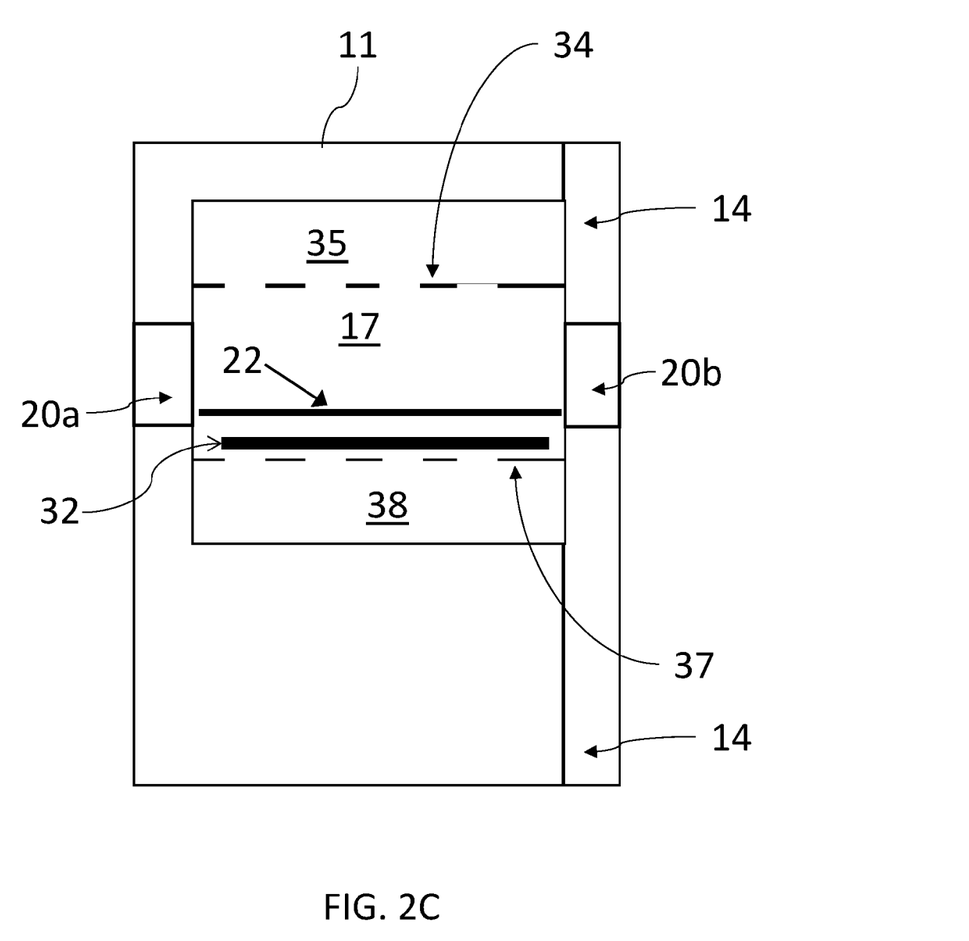

With reference now to FIGS. 2A-2C, there are respectively depicted a top, side and front cross-sectional views of housing 11, in accordance with an exemplary embodiment of the present invention. As shown, housing 11 accommodates a cavity 17 and an H-shaped rotating door 20 that comprises or supports a first food loading section 21 and a second food loading section 22. First and second food loading sections 21, 22 may be substantially identical to each other. First and second food loading sections 21, 22 may each comprise substantially planar surfaces. First and second food loading sections 21, 22 may be configured to receive cooking plates 27, 28, respectively, or directly receive food items for cooking. Any food item intended to be cooked by the oven 10 may be initially placed on either one of cooking plates 27, 28, or directly on loading sections 21, 22. Cooking plates 27, 28 can be identical or different from each other, depending on the types of food items to be prepared. Thus, cooking plate 27 may be made of a different material and/or a different design from cooking plate 28.

In accordance with an exemplary embodiment of the present invention, H-shaped rotating door 20 may comprise a side panel 20a, a side panel 20b, and a mid panel 20c connecting the side panels 20a and 20b. The mid panel 20c may connect the mid sections of the first and second side panels 20a and 20b in such a way that these panels 20a, 20b, 20c together form the shape of a letter "H" or the like if seen from above as shown in FIG. 2A. Mid panel 20c serves as a divider between first and second food loading sections 21, 22. As shown in FIG. 2A, side panel 20a is adjacent to one side edge of first food loading section 21 and one side edge of second food loading section 22, and side panel 20b is adjacent to the opposite side edge of first food loading section 21 and the opposite side edge of second food loading section 22.

A portion of side panel 20a, a portion of side panel 20b, and mid panel 20c together serve as an oven cover to substantially block the opening 12 and prevent heat within cavity 17 from escaping through the opening 12, depending on the placement of H-shaped rotating door 20 in relation to the opening 12. During cooking operations (e.g., when one of the first and second food loading sections 21, 22 is placed substantially within the cavity 17), opening 12 can be substantially covered or blocked by portions of H-shaped rotating door 20 (e.g., half of side panel 20a, half of side panel 20b and mid panel 20c) that are adjacent to the food loading section placed within the cavity 17.

H-shaped rotating door 20 may be designed to rotate around the rotation axis x located at the center of mid panel 20c as shown in FIG. 2A. Preferably, H-shaped rotating door 20 is substantially symmetric in 180° rotation around the rotation axis x.

In accordance with an exemplary embodiment of the present invention, the inside walls of housing 11 at the opening 12 and the ends of both side panels 20a, 20b may be slanted at an angle (e.g., 45°) as shown in FIG. 2A, to allow H-shaped rotating door 20 to rotate and to substantially block the opening 12 to prevent heat loss from cavity 17.

In accordance with an exemplary embodiment of the present invention, the cook setting for the oven 10 when the first food loading section 21 is located within the cavity 17 and the cook setting for the oven 10 when the second food loading section 22 is located within the cavity 17 may be independently controllable (e.g., via control panel 15). In other words, the cook setting for cooking a food item placed on the first food loading section 21 when it is located within the cavity 17 can be different from the cook setting for cooking a food item placed on the second food loading section 22 when it is located within the cavity 17. Examples of cook setting parameters include, without limitation, cooking time, cooking temperature or a pre-set sequence of different cooking temperatures, blower speed, the type(s) of heating element to be used during cooking operation (e.g., pressurized hot air stream, microwave heating, infrared radiation heating, depending on its availability in the oven 10), and/or any other cooking condition that can be set or provided by the oven 10.

In addition, the oven 10 may be pre-programmed with a separate and independent cook setting before each of the first and second food loading sections 21, 22 rotates into the cavity for cooking operation. For example, operating parameters for the oven 10 to cook any food items placed on food loading section 21 can be entered at control panel 15 (from FIG. 1) before the food loading section 21 is rotated into cavity 17 through the opening 12. Similarly, operating parameters for the oven 10 to cook any food items placed on food loading section 22 can be entered at control panel 15 (from FIG. 1) before the food loading section 22 is rotated into cavity 17 through the opening 12. In alternative embodiments, the oven 10 may comprise two separate control panels, one for the first food loading section 21 and the other for the second food loading section 22.

When food loading section 21 is located inside cavity 17 where food is being cooked, food loading section 22 is located outside cavity 17 where it is being cooled by, for example, the ambient air of a kitchen in which the oven 10 may reside. Similarly, when food loading section 22 is located inside cavity 17 where food is being cooked, food loading section 21 is located outside cavity 17 where it is being cooled by the ambient air of the kitchen. Due to the large temperature differential between the cooled food loading section 21 (or food loading section 22) and heated cavity 17, food loading section 21 (or food loading section 22) can be sent into cavity 17 to rapidly bring down the temperature of cavity 17, when necessary, after food loading section 21 (or food loading section 22) has been sufficiently cooled down by the ambient air. In essence, the air-cooled food loading section 21 (or food loading section 22) may be used to serve as a heat sink for absorbing the heat within cavity 17. From a time-saving standpoint, this maneuver is particularly advantageous in getting the oven 10 ready for cooking a food item that requires a lower cooking temperature than the current temperature of cavity 17. This is because it takes less time to raise the temperature of cavity 17 up to the desired temperature by the heating and airflow system (after cavity 17's current temperature has been lowered by one of food loading sections 21, 22) than to lower cavity 17's current temperature down to the desired temperature by allowing heat to escape from cavity 17.

H-shaped rotating door 20 can be driven to rotate either clockwise or counter-clockwise by any given angle by a motor 26 (e.g., stepper motor), as shown in FIG. 2B, that provides the rotational movement for H-shaped rotating door 20. Although H-shaped rotating door 20 is shown to be moved by a motor, it is understood by those skilled in the art that H-shaped rotating door 20 can also be rotated manually or by a variety of other motorized movement designs.

The oven 10 includes a heating and airflow system to supply heat to cavity 17 for heating up any food items that have been carried on one of the first and second food loading sections 21, 22 into cavity 17 via H-shaped rotating door 20. As shown in FIGS. 2B-2C, the heating and airflow system may include one or more of a top air heating element 30, a bottom air heating element 31, a top plenum 35 and a bottom plenum 38. The heating system may also include an infrared (IR) heating element 32. It is understood by those skilled in the art that other heating means, such as microwave, steam or a combination thereof, can be used instead of or in addition to air/IR heating elements 30-32.

As shown in FIG. 2C, top plenum 35 may be connected to a top air inlet plate 34. Bottom plenum 38 may be connected to a bottom air inlet plate 37. Blower 33 moves air into top plenum 35 and/or bottom plenum 38. Heated air in top plenum 35 and bottom plenum 38 are in gaseous communication with cavity 17 through top air inlet plate 34 and bottom air inlet plate 37, respectively. Top air inlet plate 34 and bottom air inlet plate 37 may each include multiple rectangular shaped tubes for directing hot pressured airstream towards any food items placed on the portion of H-shaped rotating door 20 located within cavity 17. Although air passes through top inlet plate 34 and bottom air inlet plate 37 into cavity 17, it is understood by those skilled in the art that top plenum 35 or bottom plenum 38 can be in gaseous communication through a variety of air opening configurations such as conical shaped nozzles and the like. Moreover, air could enter cavity 17 through only one of top plenum 35 and bottom plenum 38.

The diameter of the air inlet tubes on top and bottom air inlet plates 34, 37 may range from 0.25" to 0.75". Each of the air inlet tubes can provide a pressurized hot airstream of approximately 1" to 2" width coverage directed towards any food items placed on the portion of H-shaped rotating door 20. In various embodiments, depending on the height of the tallest food that can be allowed to be placed on food loading sections 21, 22, the top air inlet plate 34 may be placed approximately 4" above food loading sections 21, 22. In various embodiments, the bottom air inlet plate 37 may be placed approximately 1" below food loading sections 21, 22.

After a food item has been placed within cavity 17, H-shaped rotating door 20 can stop moving, and pressurized hot airstream can be directed towards the food item to begin the cooking process. At this point, H-shaped rotating door 20 may rotate in a slight clockwise and counter-clockwise fashion within the width of the rotating door (e.g., within the width of side panels 20a, 20b and mid panel 20c). For example, H-shaped rotating door 20 may vacillate between 5° clockwise from the stopping point and 5° counter-clockwise from the stopping point in order to increase the hot airstream coverage on the food item on H-shaped rotating door 20, and to avoid overheating of a food item at any spot located directly underneath and/or above one of the air inlet tubes. It will be appreciated by those skilled in the art that the placement of air inlet tubes in top air inlet plate 34 and also the placement of air inlet tubes in bottom air inlet plate 37 will be selected such that the slight clockwise and counter-clockwise movements by rotator 20 will be sufficient to travel the left-to-right distance between individual air inlet tubes in top air inlet plate 34 and bottom air inlet plate 37.

In accordance with an exemplary embodiment of the present invention, the diameters of air inlet tubes may increase along the radius from the rotation axis x. Basically, the diameters of the air inlet tubes near x are relatively smaller than the diameters of the air inlet tubes farther from x in order to avoid the food portion located near x being overcooked.

Figure 3A:
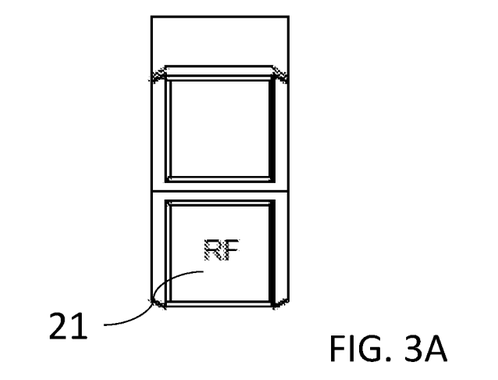
FIGS. 3A-3C illustrate a method of cooking when only one of food loading sections of the oven from FIG. 1 is being used, in accordance with an exemplary embodiment of the present invention.
Figure 3B:
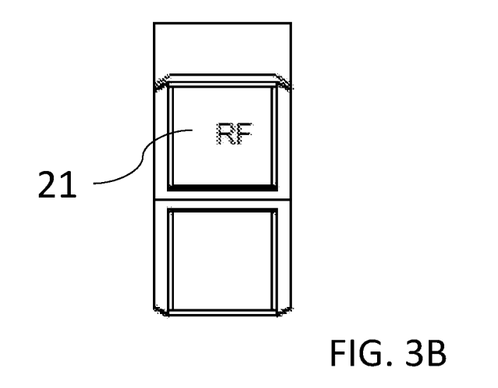
Figure 3C:
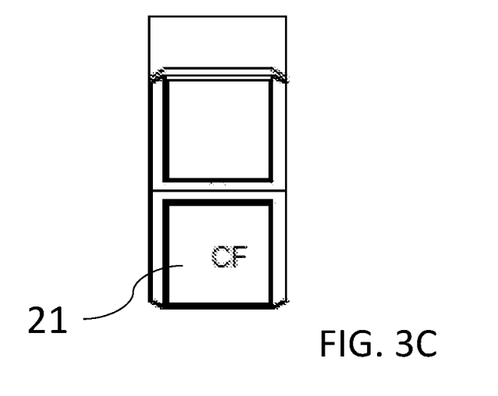

Referring now to FIGS. 3A-3C, there are illustrated a method of cooking when only one of food loading sections 21, 22 is being used, in accordance with an exemplary embodiment of the present invention. An uncooked raw food item (RF) is initially placed on food loading section 21 (or 22), as shown in FIG. 3A. An operator then enters an appropriate cook settings for cooking the food item via control panel 15, and food loading section 21 (or 22) is subsequently rotated and placed within cavity 17, as depicted in FIG. 3B. After a period of time has lapsed and the cooking operation has been completed, food loading section 21 (or 22) is rotated and exits cavity 17, and the fully cooked food item (CF) is ready to be removed from food loading section 21 (or 22) by an operator, as shown in FIG. 3C.

Figure 4A:
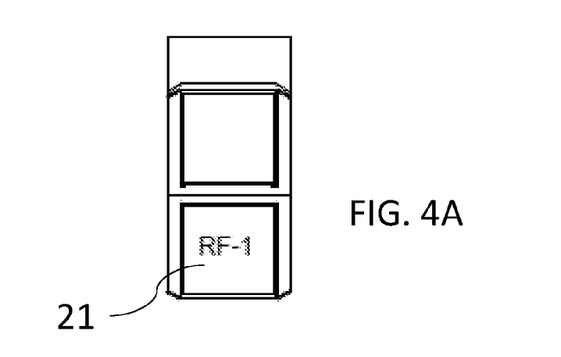
FIGS. 4A-4D illustrate a method of cooking when both food loading sections of the oven from FIG. 1 are being used, in accordance with an exemplary embodiment of the present invention.
Figure 4B:
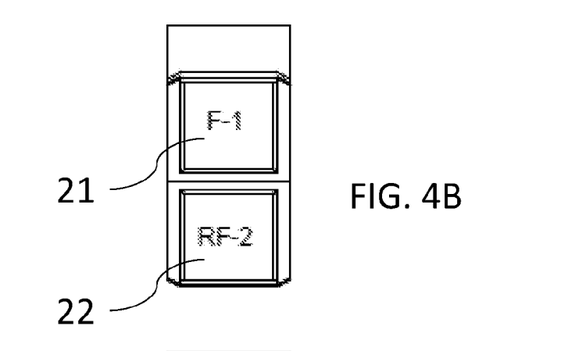

With reference now to FIGS. 4A-4D, there are illustrated a method of cooking when both food loading sections 21, 22 are being used, in accordance with an exemplary embodiment of the present invention. A first uncooked raw food item (RF-1) is initially placed on food loading section 21, as shown in FIG. 4A, and an operator enters an appropriate cook settings for cooking the first food item via control panel 15. Food loading section 21 is subsequently rotated to be placed inside cavity 17. While the first food item is being cooked (F-1), a second uncooked raw food item (RF-2) can be placed on food loading section 22, as depicted in FIG. 4B, and the operator enters an appropriate cook settings for cooking the second food item via control panel 15. After a period of time has lapsed and the cooking operation for the first food item has been completed, food loading section 21 on which the first food item is fully cooked (CF-1) is rotated and exits cavity 17 while food loading section 22 is being rotated to be placed inside cavity 17.

Figure 4C:
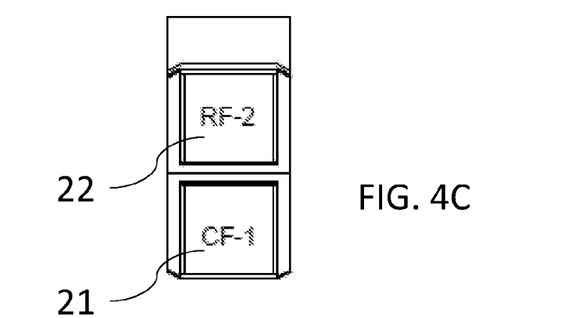
Figure 4D:
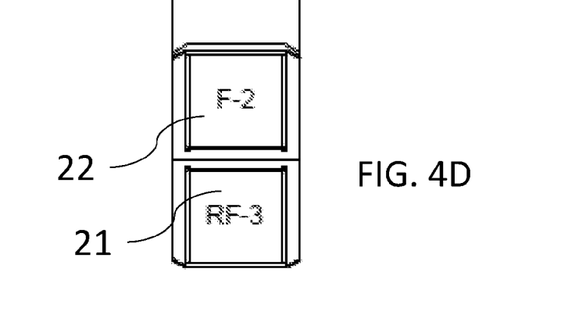

While the second food item is being cooked (F-2), the fully cooked first food item (CF-1) is ready to be removed from food loading section 21 by the operator, as shown in FIG. 4C. While the second food item is being cooked (F-2), a third uncooked raw food item (RF-3) can be placed on food loading section 21, as depicted in FIG. 4D, and the operator enters an appropriate cook settings for cooking the third food item via control panel 15.

The above-mentioned sequence can be performed repeatedly for different food items. Since different cook settings (e.g., cooking times) can be entered by an operator (e.g., via control panel 15), any of the above-mentioned food items can be completely different from each other.

As has been described, the present invention as implemented in various embodiments can provide an oven having an H-shaped rotating door for continuously and efficiently cooking a wide variety of food items while minimizing heat loss.

While this invention has been described in conjunction with exemplary embodiments outlined above and illustrated in the drawings, it is evident that many alternatives, modifications and variations in form and detail will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A method of cooking food items in an oven, the oven comprising:
   an oven cavity,
   an opening for loading a food item into the oven cavity,
   a rotating door comprising a first food loading section, a second food loading section, a first side panel, a second side panel, and a mid panel, the first and second side panels being parallel to each other, the mid panel being perpendicular to the first and second side panels and connected to a mid section of each of the first and second side panels in such a way that the first and second side panels and the mid panel together form a shape of a capital letter "H" when viewed from above, the first and second side panels and the mid panel partially enclosing each of the first and second food loading sections, and the mid panel serving as a divider between the first and second food loading sections, wherein when one of the first and second food loading sections is located within the oven cavity, the other one of the first and second food loading sections is located outside of the oven cavity and portions of the first and second side panels adjacent to the one of the first and second food loading sections and the mid panel together substantially block the opening to prevent the heat within the cavity from escaping through the opening, and
   a control panel for entering a cook setting of the oven,
   the method comprising the steps of:
   placing a first food item in the first food loading section when the first food loading section is located outside the oven cavity;
   entering a first cook setting for the first food item into the control panel;
   rotating the rotating door to place the first food loading section within the oven cavity;
   initiating a first cooking operation based on the first cook setting when the first food item is placed within the oven cavity;
   placing a second food item in the second food loading section when the second food loading section is located outside the oven cavity and the first food item is placed within the oven cavity;
   entering a second cook setting for the second food item into the control panel, while the second food item is located outside the oven cavity and the first food item is being cooked within the oven cavity;
   after completion of the first cooking operation, rotating the rotating door to place the first food loading section outside the oven cavity and the second food loading section within the oven cavity;
   initiating a second cooking operation based on the second cook setting when the second food item is placed within the oven cavity; and
   removing the first food item from the first food loading section.

2. The method of claim 1, further comprising the steps of:
   after removal of the first food item from the first food loading section, placing a third food item in the first food loading section when the first food loading section is located outside the oven cavity and the second food item is placed within the oven cavity; and
   entering a third cook setting for the third food item into the control panel, while the third food item is located outside the oven cavity and the second food item is being cooked within the oven cavity.

3. The method of claim 1, wherein the step of initiating a first cooking operation comprises rotating the rotating door in a clockwise and counter-clockwise fashion within the width of the rotating door during the first cooking operation.

4. The method of claim 3, wherein the step of rotating the rotating door in a clockwise and counter-clockwise fashion comprises vacillating the rotating door between 5° clockwise from a stopping point and 5° counter-clockwise from the stopping point during the first cooking operation.

5. The method of claim 1, wherein the step of rotating the rotating door to place the first food loading section within the oven cavity comprises using a motor.

6. The method of claim 1, wherein the step of rotating the rotating door to place the first food loading section within the oven cavity comprises closing the opening of the oven cavity with the rotating door.

7. The method of claim 1, wherein the step of rotating the rotating door to place the second food loading section within the oven cavity comprises using a motor.

8. The method of claim 1, wherein the step of rotating the rotating door to place the second food loading section within the oven cavity comprises closing the opening of the oven cavity with the rotating door.

9. The method of claim 1, wherein the first cook setting and the second cook setting are different.

10. The method of claim 1, wherein the first and second cook settings are independently controllable by the control panel.

11. A method of cooking food items in an oven, the oven comprising:
an oven cavity,
an opening for loading a food item into the oven cavity, and
a rotating door comprising a first food loading section, a second food loading section, a first side panel, a second side panel, and a mid panel, the first and second side panels being parallel to each other, the mid panel being perpendicular to the first and second side panels and connected to a mid section of each of the first and second side panels in such a way that the first and second side panels and the mid panel together form a shape of a capital letter "H" when viewed from above, the first and second side panels and the mid panel partially enclosing each of the first and second food loading sections, and the mid panel serving as a divider between the first and second food loading sections, wherein when one of the first and second food loading sections is located within the oven cavity, the other one of the first and second food loading sections is located outside of the oven cavity and portions of the first and second side panels adjacent to the one of the first and second food loading sections and the mid panel together substantially block the opening to prevent the heat within the cavity from escaping through the opening,
the method comprising the steps of:
placing a first food item in the first food loading section when the first food loading section is located outside the oven cavity;
rotating the rotating door to place the first food loading section within the oven cavity;
cooking the first food item placed within the oven cavity;
placing a second food item in the second food loading section when the second food loading section is located outside the oven cavity and the first food item is placed within the oven cavity;
after the step of cooking the first food item is completed, rotating the rotating door to place the first food loading section outside the oven cavity and the second food loading section within the oven cavity;
cooking the second food item placed within the oven cavity; and
removing the first food item from the first food loading section.

12. The method of claim 11, further comprising the step of:
after removal of the first food item from the first food loading section, placing a third food item in the first food loading section when the first food loading section is located outside the oven cavity and the second food item is placed within the oven cavity.

13. The method of claim 11, wherein the step of cooking the first food item comprises rotating the rotating door in a clockwise and counter-clockwise fashion within the width of the rotating door.

14. The method of claim 13, wherein the step of rotating the rotating door in a clockwise and counter-clockwise fashion comprises vacillating the rotating door between 5° clockwise from a stopping point and 5° counter-clockwise from the stopping point.

15. The method of claim 11, wherein the step of rotating the rotating door to place the first food loading section within the oven cavity comprises using a motor.

16. The method of claim 11, wherein the step of rotating the rotating door to place the first food loading section within the oven cavity comprises closing the opening of the oven cavity with the rotating door.

17. The method of claim 11, wherein the step of rotating the rotating door to place the second food loading section within the oven cavity comprises using a motor.

18. The method of claim 11, wherein the step of rotating the rotating door to place the second food loading section within the oven cavity comprises closing the opening of the oven cavity with the rotating door.

19. The method of claim 11, wherein the first food item and the second food item are different.

20. The method of claim 11, wherein the step of cooking the first food item and the step of cooking the second food item are independently controllable by a control panel of the oven.

* * * * *